United States Patent Office 3,322,677

Patented May 30, 1967

1

3,322,677

ETHYLENEDIAMINE-ANISOLE PAINT-STRIPPING COMPOSITIONS

Myer Rosenfeld, Baltimore, Md., assignor to the United States of America as represented by the Secretary of the Army No Drawing. Filed July 2, 1964, Ser. No. 380,101

4 Claims. (Cl. 252—153)

The invention described herein may be manufactured and used by or for the Government for governmental purposes, without the payment to me of any royalty thereon.

This invention relates to novel compositions of matter useful for stripping or softening paint and processes employing the same. The present compositions are particularly concerned with the removal of paint from a nonferrous metal base.

The compositions of the invention are mixtures of ethylenediamine and anisole in which the ethylenediamine:anisole volume ratios vary between 38:62 and 90:10, around 50:50 being preferred.

The mixtures described above are corrosive to magnesium. Corrosive attack on this base is readily avoided by a small but effective amount of colloidal silica. An effective amount of this material is supplied by adding to the paint-stripping mixtures 2 to 3% by volume of a 40° Baumé solution of sodium silicate diluted with four parts of water. The order of addition here is highly important, since effective inhibition is obtained with one order only. The anisole and diluted sodium silicate are first mixed thoroughly and ethylenediamine is added thereto. Thorough agitation is employed during or after each of the two mixing steps. The explanation of the criticality of the order of addition lies probably in the ultimate particle size of the colloidal silica.

The ethylenediamine, anisole and other chemicals used in the invention can be of the usual commercial grade. Technical grade and purified grade anisole give similar stripping effects but the purified form is less obnoxious in odor when mixed with ethylenediamine.

In utilizing the present ethylenediamine-anisole composition, a painted surface is contacted with one of said compositions for a short and noncritical period of time, usually not more than an hour, at ambient or room temperature. If the paint has not been spontaneously removed during this contact period, it can be scraped off its base as by steel wool. If it is desired to remove the paint solely by spraying with water, a contact time of up to six hours or so may be necessary.

It will be evident from the examples below that the invention is especially useful for the removal of aged amine-cured epoxy paints. It is also effective with other paint systems, e.g., semigloss alkyd enamel; alkyd base rust-inhibiting iron oxide primer top-coated with lusterless alkyd enamel; nitrocellulose-alkyd lacquers; styrenated alkyd lusterless enamels over a primer of zinc chromate; alkyd phenolic resin dispersion; etc.

The invention is particularly useful with paint on nonferrous metal bases scuch as aluminum and magnesium but is equally useful with ferrous metal bases such as steel. It is also effective with workpieces in which magnesium, aluminum and steel are galvanically coupled.

One advantage of the present invention may be noted. This is the relatively high flash point of the stripping compositions involved, i.e., 93° F. or higher.

There follow several examples which are illustrative of this invention but which are not intended as a limitation

2 upon its scope. In these examples, temperatures are ambient and parts or percentages are by volume unless otherwise noted. The ethylenediamine (EDA) used in the runs reported was more than 98% pure, the initial water content probably being below 1%. The anisole used was a commercial product. The paint-stripping mixtures employed were mixed as described above and contained an effective amount of colloidal silica as a corrosion inhibitor.

*Examples 1–9*

A series of test runs was conducted in the removal of an amine-cured, baked, epoxy paint system from finished magnesium (Dow 17) panels. Dow 17 finished magnesium is obtained by anodizing magnesium in a bath of ammonium acid fluoride, sodium dichromate, and phosphoric acid, at 75 to 100 volts from 1 to 30 minutes at 5 to 50 amps. per square foot, the treatment usually being made at 180° to 212° F. Depending upon the particular current density, time of treatment, and temperature used, coatings of 0.0002 to 0.001 inch thick are obtained.

An epoxy paint with ethylenediamine as a curing agent was mixed, applied to the anodized magnesium, baked for 20 minutes at 300° F. and cooled. Four drops of paint-stripping composition were placed on the coating and allowed to stand for 25 minutes under a watch glass. Residual stripping composition was blotted with tissue paper and the spot it had occupied on the test panel rubbed with steel wool employed in circular motion. Dirt was wiped off with tissue soaked in the composition under study. Stripping was evaluated visually on a relative basis.

Results are given in the table which follows.

TABLE

| Example No. | Composition | | Scrubbing Action | Percent Paint Removal |
|---|---|---|---|---|
| | EDA (Percent) | Anisole (Percent) | | |
| 1 | 100 | 0 | Hard scrubbing | Negligible. |
| 2 | 95 | 5 | do | 2. |
| 3 | 90 | 10 | Easy scrubbing | 100. |
| 4 | 65 | 35 | do [1] | 100. |
| 5 | 50 | 50 | Easy scrubbing | 100. |
| 6 | 38 | 62 | As in Example 3 | 100. |
| 7 | 30 | 70 | Hard scrubbing | A thin layer of paint remains unremoved. |
| 8 | 35 | 65 | do | As in Example 7. |
| 9 | 0 | 100 | do | Negligible. |

[1] Harder than Example 3.

It will be noted from the table that an effective stripping mixture is formed at ethylenediamine:anisole volume ratios in the range 90:10–38:62. Outside this range, the mixtures have limited or negligible paint-stripping ability on epoxy-base paints. Both ethylenediamine and anisole alone are ineffectual with these paints.

Having now described my invention, I claim:

1. A paint-stripping composition consisting essentially of ethylenediamine and anisole in a volume ratio in the range of about 90:10–38:62, respectively.

2. A composition of claim 1 in which the ethylenediamine:anisole volume ratio is in the range of about 50:50, respectively.

3. A composition of claim 1 which includes 2 to 3 percent by volume of a 40° Baumé solution of sodium silicate diluted with four parts of water as an inhibitor for the corrosion of magnesium.

4. A composition of claim 2 which includes 2 to 3 percent by volume of a 40° Baumé solution of sodium silicate diluted with four parts of water as an inhibitor for the corrosion of magnesium.

References Cited

UNITED STATES PATENTS

| | | | |
|---|---|---|---|
| 2,929,789 | 3/1960 | Pickett et al. | 252—153 |
| 3,173,876 | 3/1965 | Zobrist | 252—153 XR |
| 3,179,609 | 4/1965 | Morison | 134—38 |
| 3,249,075 | 5/1966 | Nelson et al. | 252—387 |

OTHER REFERENCES

The Condensed Chemical Dictionary, vol. 4 (1950), Reinhold Publishing Corp., pp. 276 and 613.

LEON D. ROSDOL, *Primary Examiner.*

W. SCHULZ, *Assistant Examiner.*